(12) United States Patent
Pasch et al.

(10) Patent No.: US 6,404,972 B1
(45) Date of Patent: Jun. 11, 2002

(54) COLOR-CODED OPTICAL FIBER

(75) Inventors: Jürgen Pasch, Herne; Hans-Jürgen Lysson, Korschenbroich; Wilhelm Reiners, Wegberg; Bertram Glessner, Mönchengladbach; Ronald G. Sommer, deceased, late of Mönchengladbach, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/983,107

(22) PCT Filed: Mar. 9, 1996

(86) PCT No.: PCT/EP96/01022

§ 371 (c)(1),
(2), (4) Date: Jul. 17, 2000

(87) PCT Pub. No.: WO97/04343

PCT Pub. Date: Feb. 6, 1997

(Under 37 CFR 1.47)

(30) Foreign Application Priority Data

Jul. 15, 1995 (DE) .......................................... 195 25 816

(51) Int. Cl.⁷ ................................................. G02B 6/00
(52) U.S. Cl. ....................... 385/147; 385/128; 385/127; 385/123; 385/126
(58) Field of Search ................................. 385/147, 128, 385/127, 126, 123, 100, 102, 115

(56) References Cited

U.S. PATENT DOCUMENTS

| | | | |
|---|---|---|---|
| 4,629,258 A | * 12/1986 | Carter et al. ............. | 350/96.23 |
| 5,146,529 A | 9/1992 | Mizutani | |
| 5,259,060 A | * 11/1993 | Edward et al. ............. | 385/128 |
| 5,333,228 A | 7/1994 | Kingstone | |
| 5,345,531 A | 9/1994 | Keplinger et al. | |
| 5,350,885 A | * 9/1994 | Falciglia et al. ............. | 174/112 |
| 5,379,363 A | 1/1995 | Bonicel et al. ............. | 385/114 |
| 5,485,539 A | 1/1996 | Mills | |
| 5,796,905 A | * 8/1998 | Hoffart et al. ............... | 385/128 |
| 5,809,195 A | * 9/1998 | Brown et al. ................ | 385/114 |
| 5,982,967 A | * 11/1999 | Mathis et al. ................ | 385/102 |

FOREIGN PATENT DOCUMENTS

| | | | |
|---|---|---|---|
| DE | 3427835 | * | 6/1986 |
| DE | 3636268 | * | 4/1988 |
| DE | 3637159 | | 5/1988 |
| EP | 436221 | * | 7/1991 |
| EP | 562259 | * | 2/1994 |
| EP | 0 581 680 A1 | | 2/1994 |
| EP | 0 736 194 B1 | | 10/1996 |
| FR | 2648270 | * | 12/1990 |
| JP | 59-184304 | | 10/1984 |

OTHER PUBLICATIONS

Japanese Abstract 57 040203 (Appln. JP800114842 800822).

* cited by examiner

*Primary Examiner*—Brian Healy
*Assistant Examiner*—Sung Pak
(74) *Attorney, Agent, or Firm*—Ware, Fressola, Van der Sluys & Adolphson LLP

(57) ABSTRACT

An optical fiber (1) has an outer coating (4) enclosing the cladding (3) and the fiber core (2). The coating has one or more plastic layers and a color coding in the form of an annular marking on or in the outermost plastic layer. The annular marking is open colored rings.

14 Claims, 4 Drawing Sheets

COLOR-CODED OPTICAL FIBER

BACKGROUND OF THE INVENTION

1. Technical Field

The present invention concerns an optical fiber with an outer coating, made of one or several plastic layers, on the cladding enclosing the fiber core and a color coding in the form of an annular marking on or in the outer plastic layer.

2. Description of the Prior Art

Generic type fibers have been known for quite a while. To color code and thus keep the conductors separate during splicing or connecting operations, an annular marking is applied to the outer plastic casing of the conductor, for example by applying infrared radiation which hardens plastics, but usually by means of colored plastic bar or strip markings which are cured by applying ultraviolet radiation (UV). Since the fibers provided with color coding must undergo further processing, for example by placing them into electrical or optical cables, inserting them into protective tubes made of plastic or steel, or to produce fiber ribbons with such fibers, the usual color coding of today, for example by an annular IR marking, is not always sufficient for the specified requirements, for example with respect to resistance to wear. The non-uniform rough fiber surface required by the known annular markings can always result in problems during further fiber processing; also an increase in attenuation can often not be avoided during temperature changes in the optical transmission path. But even a simple bar or strip marking can have its drawbacks since, aside from the increased technical expense, such color coding is often difficult to distinguish.

SUMMARY OF THE INVENTION

Starting from this state of the art, the basic object of the invention therefore is to find a possibility to preclude from the beginning any influencing of the transmission characteristics of the fibers even during temperature changes, or to limit it at least to negligible values. It must furthermore be possible to code any number of fibers while ensuring that the color coding applied during the production process is preserved independently of any further operational steps during subsequent processing.

The invention achieves this object by using open colored rings for the annular marking. Turning away from the usual coding of optical fibers until now towards closed colored rings leads to a significant blending of the so-called temperature evolution, i.e. the dependence of the attenuation in dB/Km on the temperature in ° C. In this case, the invention is based on the knowledge that the closed colored rings established until now by means of spacing, have a pressurizing effect on the optical fiber in these discrete areas, but that such pressure load with the resulting increase in attenuation is absent if instead of the annular marking in the form of closed colored rings, the fiber coding is carried out with open colored rings.

The open angle of the colored rings of the invention can essentially be of any size, but for reasons of the sure separation of the coded fibers it proved to be particularly useful when the opening of the colored rings is at most 180° as measured around the perimeter of the optical fiber.

It is useful to choose semicircles for the open colored rings, or such in which the progression of open colored ring is interrupted along the fiber perimeter. For example, the colored resin forming a semicircle can also be a dotted or a dashed line.

Another advantageous configuration of the invention results if the open colored rings are formed so that the progression of the colored rings along the fiber perimeter is interrupted by spaces. In this way, the open colored rings formed by the spaces along the fiber perimeter are allowed to remain as a continuous series of colored dots and/or bars. Of course in this case it is also possible and often particularly advantageous if the colored rings formed by the colored dots and/or bars have an opening which is at most 180° as measured around the perimeter.

It can also be advantageous to stagger the openings of consecutive colored rings now and then in the direction of the fiber, perhaps as a further development of the invention, so that the spatial offset of the openings takes place along a helix that winds around the fiber. In this way, it is possible to clearly identify the respective fiber despite the lack of an annular section which completes the colored ring of the invention into a full ring.

Special advantages result from an additional development of the invention by means of a further transparent or translucent layer which covers the annular marking of open colored rings and extends continuously along the length of the fiber. Namely such a further layer allows e.g. a colored semicircle located under it to appear optically as a full ring. In this way, an optical fiber constructed in accordance with the invention does not differ optically from a conventional full ring colored marking, but has better attenuation characteristics than the latter. Beyond that the color coding is protected against mechanical wear, the smooth surface protection with the uniform outer diameter ensures that the coded fiber can be processed further without any problems. High strength in the further layer can be achieved by appropriately selecting the materials, this means on the other hand that with the often unavoidably increased mechanical stresses during further processing of the fiber the optical properties of the fiber do not suffer any deterioration; to the contrary, an improvement of the transmission characteristics can be observed. Also by appropriately selecting the materials, the further layer can be used as an additional surface protection against moisture and solvents, this means that further areas of applying the optical transmission technology can be found with a fiber constructed in accordance with the invention. Since each color coding is mechanically protected by the translucent or transparent further layer of the invention immediately after the fiber is manufactured, i.e. prior to any further processing of the optical fiber, any combination of colors can be safely applied to the fiber of the invention for any application.

Since the further layer covering the color coding for the subsequent identification of each individual fiber must be made of a transparent or translucent material, it could be useful to use clear resin in a further development of the invention.

Another particularly advantageous variation of the invention when the further transparent or translucent layer is colored, is that it comprises a colored resin. This provides a number of further color combinations when the invention is carried out.

Among the resin which are suitable for the purposes of the invention, those based on polyimide, polyester, polyether, polysulfone or polyurethane should be mentioned for example.

The resin for the further layer but also for the open color coding rings may be those which can be cured by means of infrared radiation and have thus entered into the technology as so-called IR resin; a special advantage is the use of resin which can be cured by ultraviolet radiation, they are so-called UV resin which have a higher viscosity than the IR resin and are therefore particularly well suited e.g. to homogenize the further layer because of the color coding that is applied to the cladded fiber under it. Thus a combination of resin proved to be particularly useful for the invention, whereby the open colored rings are made of an IR-hardening resin and the further layer is made of an UV-hardening resin.

If it becomes necessary to increase production speed, it may be advantageous to use UV-hardening resin for both the open colored rings as well as the further layer. Another possibility of additionally developing the invention is to replace the IR-hardening and/or the UV-hardening resin with solvent-containing resin.

Since it is important for the purposes of the invention to stabilize the optical fiber equipped with the further layer against mechanical forces acting from the outside, and at the same time to protect it from moisture, acids or such, when carrying out the invention the thickness of the further layer should be chosen to be on the order of magnitude of 1–10 $\mu$m, preferably 3–6 $\mu$m.

Particularly if the further layer encloses the fiber as a continuous protective layer, it is important to choose a thickness for this colored layer forming the annular marking which is suitable for the purposes of the invention. The thickness of the colored layer forming the annular marking is therefore 0.5–5 $\mu$m, preferably 1–3 $\mu$m; this leads to a particularly even surface quality of the optical fiber.

The invention will be fully understood when reference is made to the following detailed description taken in conjunction with the accompanying drawings.

DETAILED DESCRIPTION OF THE INVENTION

Figure 1:
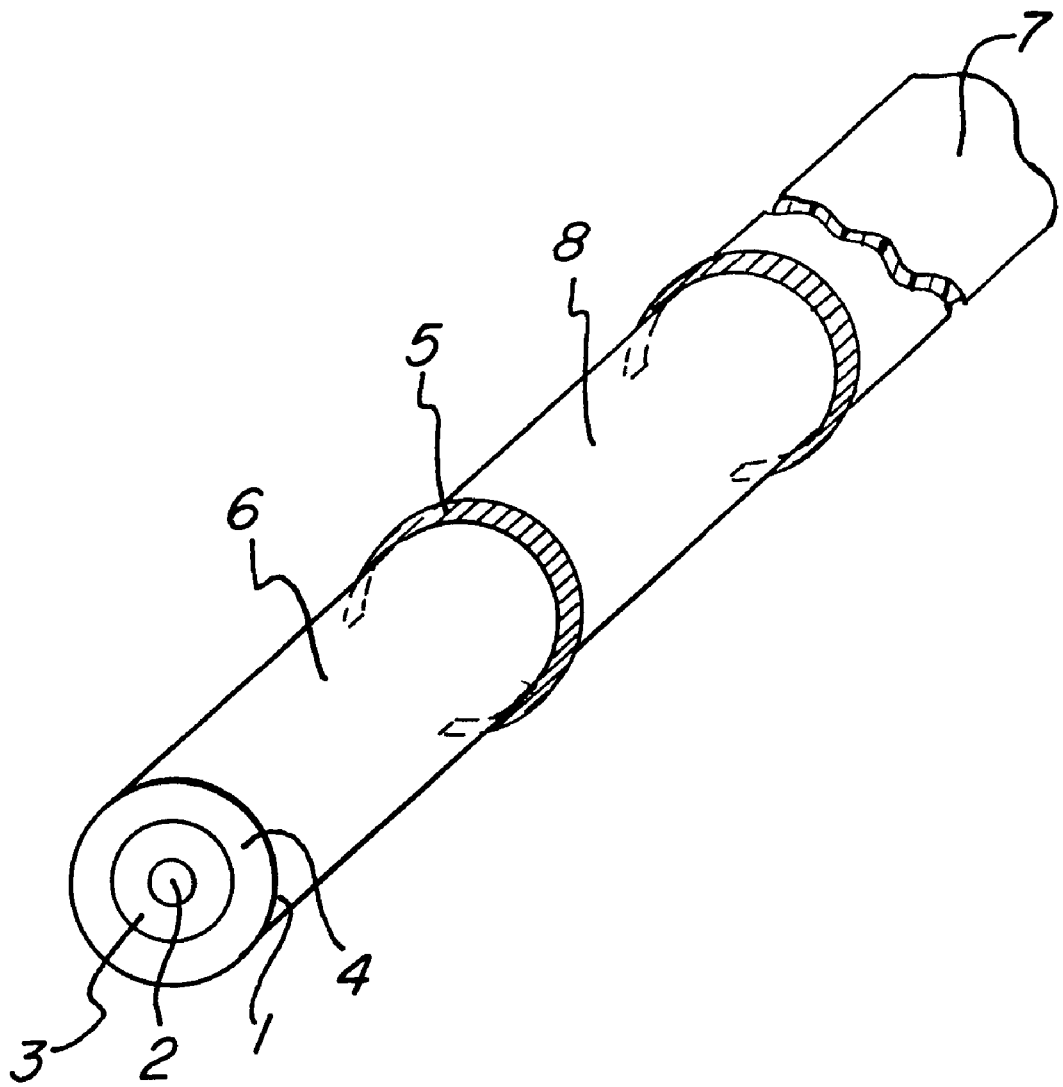
FIG. 1 is a perspective view of a first embodiment of the invention.

The optical fiber 1 illustrated in FIG. 1, with a fiber core 2 and the cladding 3 made e.g. of a quartz glass, has the so-called coating 4, which comprises one or several plastic casings to protect the fiber. Immediately above this coating 4 is a color coding in the form of open colored rings 5 spaced in the perimeter direction, the material of which is an IR or UV-hardening resin. In the embodiment, the thickness of the layer of colored rings 5 is 3–4 $\mu$m, the area that is left open by a fully colored ring according to the invention is designated by 6. In order to let such an open colored ring 5 appear optically as a full ring for the better identification of each fiber 1, and at the same time to positively prevent any wear of the color coding during further processing, the transparent or translucent layer 7 is provided, which covers the color coded fiber along its entire length. The material for this further layer 7 is a UV-hardening resin based on polyimide, polysulfone or polyurethane for example. With the assumed thickness of 3 $\mu$m of the open colored rings 5, the thickness of the further layer 7 is 5 $\mu$m for example, so that all the colored rings 5 are covered and the material of the further layer fills the areas 8 between two respective colored rings 5. In this way, a continuous mechanical protection is achieved for the color coding, the fiber has better transmission properties and can be identified without problems because of the optically discernible closed colored rings.

Further color variations and thereby further differentiating possibilities are provided if according to the invention the further layer 7 is colored or dyed, for example by using a colored resin. In this way perhaps black or blue single or double rings 5 made of an IR-hardening resin in an open configuration can be covered by a yellow, red or green-dyed further layer of resin 7 which is preferably UV-hardening and therefore has a higher viscosity. The colored and essentially open single or double rings 5 can be easily identified as full rings since the colored further layer 7 is at least translucent. The selection of contrasting color combinations facilitates the identifiability of the coded fiber.

In the embodiment of the invention illustrated in FIG. 1, the optical fiber can also be a plastic fiber; the further layer 7 can also be a layer of a UV-hardening resin with a polyester or polyether base.

The coding of an optical fiber made of glass or plastic according to the invention, with markings of open colored rings which are preferably half-rings, leads to particularly favorable transmission values. For an optical glass fiber, FIGS. 2a and 2b illustrate the progress of the so-called temperature process for a color marking of the fiber by means of the closed colored rings which are usual today, while FIGS. 3a and 3b describe the result of an optical fiber under the same measuring conditions, which in the embodiment has a color coding of open colored rings that are semicircular.

Figure 2A:
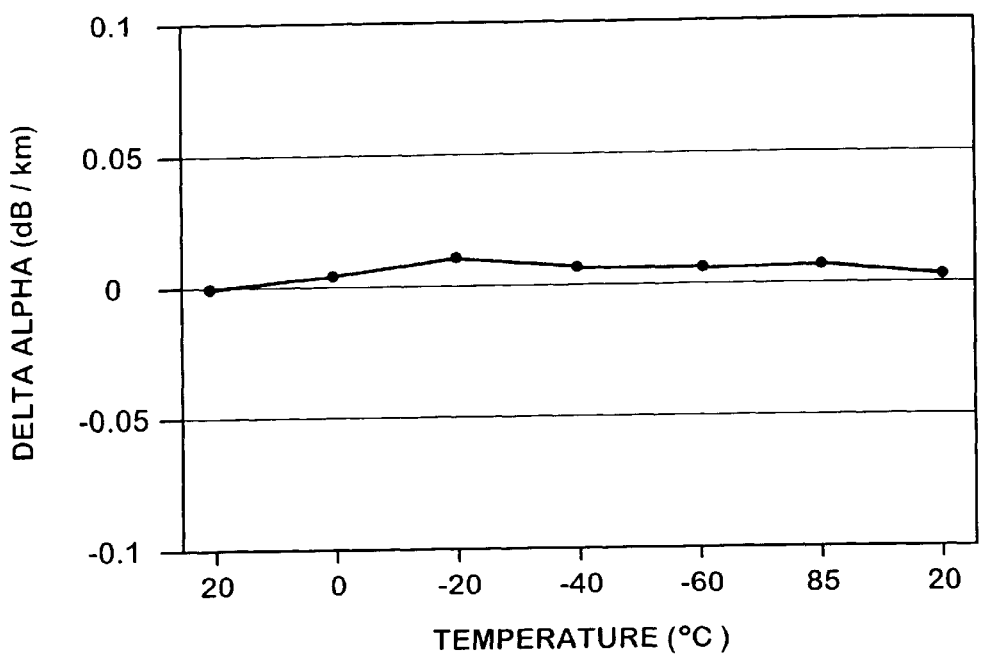
FIGS. 2a and 2b are graphical illustrations of the progress of the so-called temperature process for a fiber having color marking of closed colored rings found in the prior art.
Figure 2B:
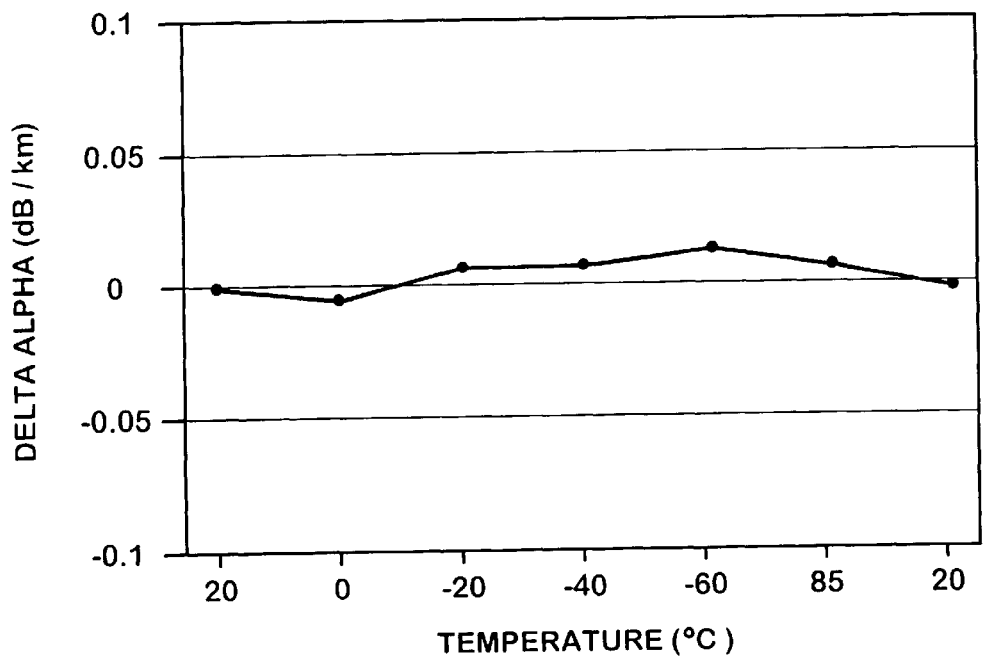
Figure 3A:
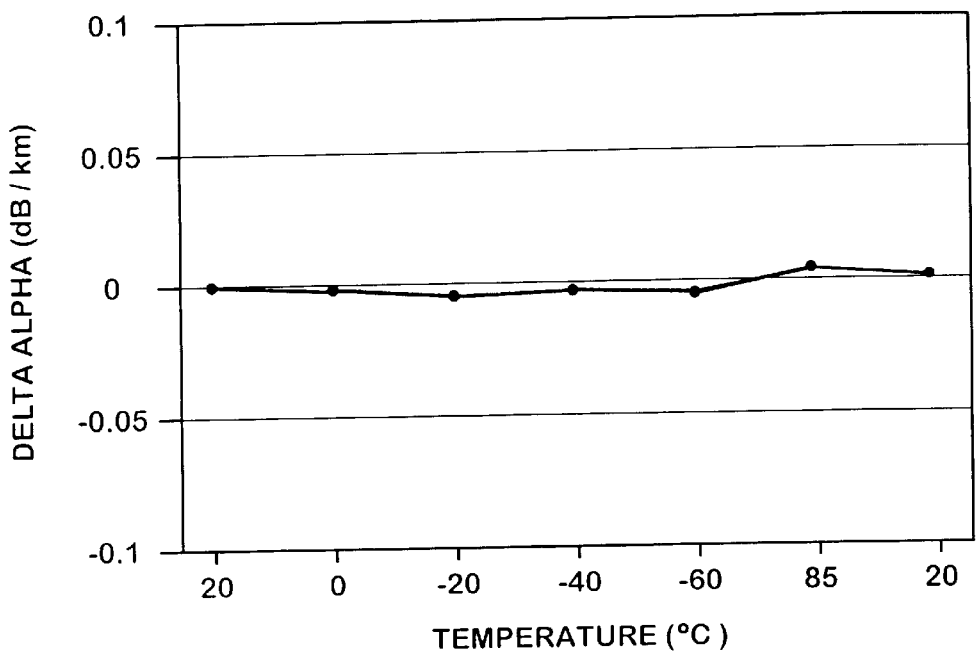
FIGS. 3a and 3b are graphical illustrations of the progress of the so-called temperature process for a fiber having color marking of semicircular open colored rings of the invention.
Figure 3B:
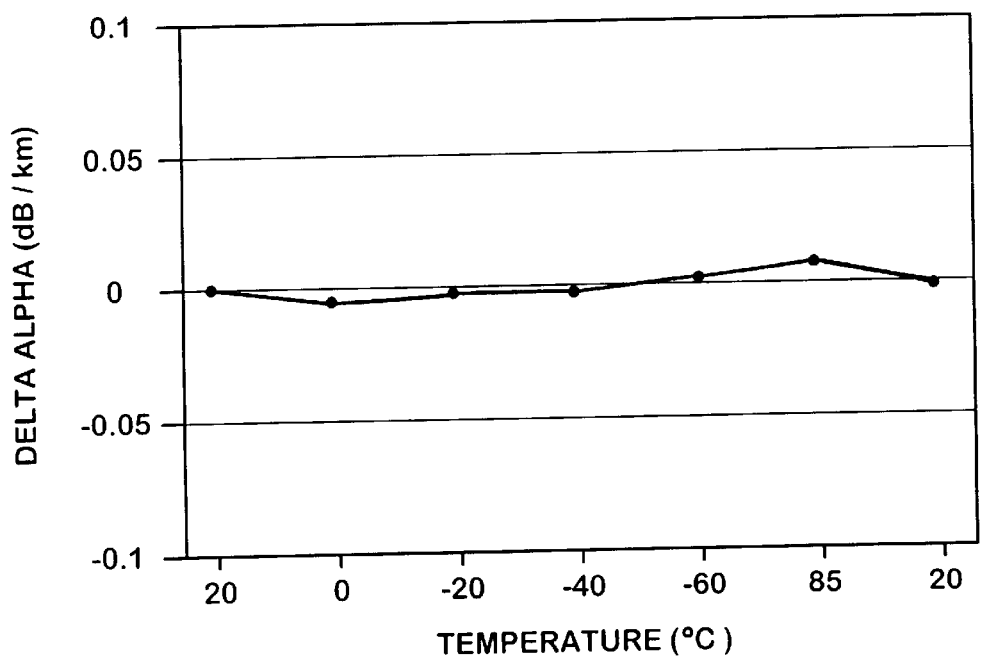

FIGS. 2a and 2b differ from each other through the respectively chosen attenuation change of 1310 and 1550 nm; the same parameters were chosen for the temperature process of a fiber according to the invention in FIGS. 3a and 3b.

A comparison of FIGS. 2 and 3 clearly shows a reduction of the attenuation in the proven temperature ranges for the optical fiber coded with open colored rings according to the invention. When the color coding is in the form of half-rings e.g., which can additionally be presented in a dotted and therefore interrupted form, the immediate surround field of the optical fiber is kept free of mechanical forces in the areas of the "annular" coding. The forces derived from the layered construction which was chosen for the purpose of a predetermined application, are neutralized by the measures of the invention.

Figure 4:
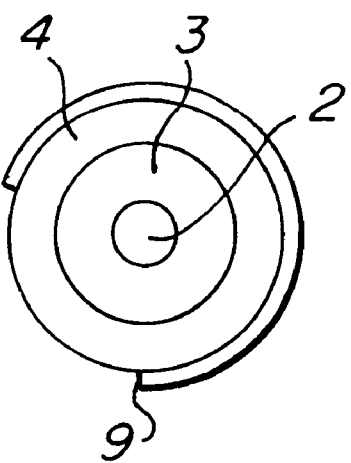
FIG. 4 is an end view of the first embodiment.
Figure 5:
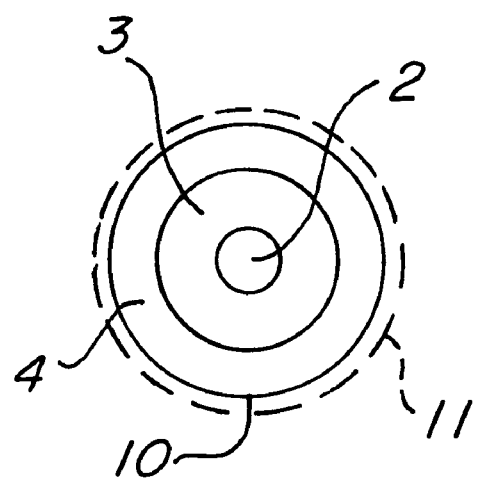
FIG. 5 is an end view of another embodiment of the invention.

FIGS. 4 and 5 depict variations of an open colored ring of the invention. In accordance with the construction of a glass fiber 1 in FIG. 1, in this case the same construction is chosen without being limited to glass fibers, namely with a fiber core 2, a cladding 3 and the so-called coating 4.

Corresponding to FIG. 1, FIG. 4 shows an open colored ring 9 with a continuous color, in this case the opening is about 100°–110°. Such an open colored ring 9 can be optically identified as a full ring under the further layer, but the invention provides better transmission properties as compared to a colored ring that has the mechanical effect of a real full ring.

Deviating from FIG. 4, FIG. 5 illustrates another configuration of the open colored ring proposed by the invention. For the same fiber construction, in this case the open colored ring 10 contains a color sequence which is interrupted along the entire perimeter. To achieve this, the colored ring 10 is formed of a number of colored dots and/or colored dashes 11 spaced sequentially along the perimeter.

The invention admirably achieves the objects thereof previously described. However, it will be appreciated that departures can be made by those skilled in the art without departing from the spirit and scope of the invention which is limited only by the following claims.

What is claimed is:

1. An optical fiber comprising:
   (a) a fiber core;
   (b) a cladding surrounding the fiber core;
   (c) a coating made of at least one plastic layer surrounding the cladding; and
   (d) a color coding including open colored rings in conjunction with an outer plastic layer of the coating, wherein each open colored ring extends in an arc in the range of about 250° to 260° thereby defining an open area an arc in the range of about 110° to 100°.

2. An optical fiber as claimed in claim 1, wherein the open colored rings are on the outer plastic layer.

3. An optical fiber as claimed in claim 1, wherein the open colored rings are in the outer plastic layer.

4. An optical fiber as claimed in claim 1, wherein the fiber core and the cladding are made of quartz glass.

5. An optical fiber as claimed in claim 1, wherein the fiber core and the cladding are made of plastic.

6. An optical fiber as claimed in claim 1, wherein the open areas of adjacent colored rings are offset in a perimeter direction.

7. An optical fiber as claimed in claim 6, wherein the offset of the open areas of the adjacent open colored rings is made along a helix that winds around the fiber.

8. An optical fiber as claimed in claim 1, further comprising a transparent or translucent further layer which covers the open colored rings and extends continuously along the fiber.

9. An optical fiber as claimed in claim 8, wherein the further layer is made of a colored resin.

10. An optical fiber as claimed in claim 8, wherein the open colored rings are made of a material chosen from a group consisting of IR-hardening resin, UV-hardening resin and solvent based resin and the further layer is made of a material chosen from a group consisting of IR-hardening resin, UV-hardening resin and solvent based resin.

11. An optical fiber as claimed in claim 8, wherein the open colored rings have a thickness of 0.5 to 5 $\mu$m and the further layer has a thickness of 1 to 10 $\mu$m.

12. An optical fiber as claimed in claim 11, wherein the thickness of the open colored rings is 1 to 3 $\mu$m.

13. An optical fiber as claimed in claim 12, wherein the thickness of the further layer is 3 to 6 $\mu$m.

14. An optical fiber as claimed in claim 11, wherein the thickness of the further layer is 3 to 6 $\mu$m.

* * * * *